United States Patent
Nakajima et al.

(10) Patent No.: US 8,232,863 B2
(45) Date of Patent: Jul. 31, 2012

(54) MOBILE DEVICE FOR VEHICLE

(75) Inventors: Satoshi Nakajima, Miyagi-Ken (JP); Satoshi Hayasaka, Miyagi-ken (JP); Masaki Sato, Miyagi-ken (JP); Jun Takahashi, Miyagi-ken (JP)

(73) Assignee: Alps Electric Co., Ltd., Tokyo (JP)

( * ) Notice: Subject to any disclaimer, the term of this patent is extended or adjusted under 35 U.S.C. 154(b) by 247 days.

(21) Appl. No.: 12/688,432

(22) Filed: Jan. 15, 2010

(65) Prior Publication Data
US 2010/0201483 A1  Aug. 12, 2010

(30) Foreign Application Priority Data

Feb. 6, 2009 (JP) .................................. 2009-025459

(51) Int. Cl.
H04B 1/38 (2006.01)

(52) U.S. Cl. ...................... 340/5.61; 340/5.64; 340/5.72

(58) Field of Classification Search .................. 340/5.61
See application file for complete search history.

(56) References Cited

U.S. PATENT DOCUMENTS

| | | | | |
|---|---|---|---|---|
| 4,168,496 A | * | 9/1979 | Lichtblau | .................. 340/572.4 |
| 7,071,817 B2 | * | 7/2006 | Haselsteiner et al. | ... 340/426.28 |
| 2005/0237163 A1 | * | 10/2005 | Lee et al. | .................. 340/10.51 |
| 2007/0046427 A1 | * | 3/2007 | Ghabra et al. | ............... 340/5.61 |
| 2007/0109093 A1 | | 5/2007 | Matsubara et al. | |
| 2007/0162191 A1 | * | 7/2007 | Matsubara et al. | ............... 701/1 |
| 2008/0027586 A1 | * | 1/2008 | Hern et al. | ..................... 700/284 |
| 2008/0258868 A1 | | 10/2008 | Nakajima et al. | |
| 2010/0060423 A1 | * | 3/2010 | Pillai | ........................... 340/10.1 |

FOREIGN PATENT DOCUMENTS

| | | |
|---|---|---|
| JP | 2004-304670 | 10/2004 |
| JP | 2008-266763 | 11/2008 |
| JP | 2008-266955 | 11/2008 |

* cited by examiner

*Primary Examiner* — Jennifer Mehmood
*Assistant Examiner* — Naomi Small
(74) *Attorney, Agent, or Firm* — Brinks Hofer Gilson & Lione (57) ABSTRACT

A mobile device for a vehicle includes a receiving unit that receives transmission signals transmitted from individual transmitting antennas of a vehicle-side device; a control unit that determines distances to the individual transmitting antennas using the signal strengths of the received transmission signals; and a transmitting unit that transmits, to the vehicle-side device using wireless communication, data items indicating the distances. In a time period in which communication is not performed between the mobile device and the vehicle-side device, the signal strength of a received signal is measured, thereby obtaining a measurement value, and the measurement value is stored as a noise element in a memory. When communication between the mobile device and the vehicle-side device is performed, correction for noise is performed on the signal strengths of the transmission signals transmitted from the transmitting antennas, and the distances are determined.

2 Claims, 5 Drawing Sheets

MOBILE DEVICE FOR VEHICLE

CLAIM OF PRIORITY

This application claims benefit of the Japanese Patent Application No. 2009-025459 filed on Feb. 6, 2009, which is hereby incorporated by reference in its entirety.

BACKGROUND

1. Field of the Disclosure

The present disclosure relates to a keyless entry apparatus that performs locking/unlocking of doors and so forth by performing wireless communication between a vehicle-side device and a mobile device, and, in particular, to a mobile device for a vehicle that can cause a vehicle-side device to determine, with a high accuracy, whether the mobile device is positioned inside or outside the vehicle.

2. Description of the Related Art

A keyless entry apparatus is known, which performs wireless communication between a vehicle-side device provided in a vehicle and a mobile device carried by a user, and which performs locking/unlocking of doors of the vehicle. Furthermore, a passive keyless entry apparatus is known, which automatically performs, when a mobile device is moved close to a vehicle, communication between a vehicle-side device and the mobile device, which authenticates an identification (ID) that is specific to the mobile device, and which performs operations of locking/unlocking doors of the vehicle.

The above-mentioned passive keyless entry apparatus is required to be capable of determining whether the mobile device exists outside or inside the vehicle. For this reason, in the vehicle-side device, portions of the vehicle are provided with a plurality of transmitting antennas. The mobile device detects the signal strengths of signals that are received from the individual transmitting antennas. The position of the mobile device is calculated using information items indicating the signal strengths, and whether the mobile device is positioned inside or outside the vehicle is determined (for example, see Japanese Unexamined Patent Application Publication No. 2008-266955).

Regarding a keyless entry apparatus described in Japanese Unexamined Patent Application Publication No. 2008-266955, a vehicle-side device is provided with a vehicle-side transmitting unit that is connected, via signal lines, to a plurality of transmitting antennas for transmitting request signals, and a vehicle-side receiving unit that receives answer signals. Furthermore, a mobile device is provided with a mobile-device receiving unit that receives the request signals, a mobile-device transmitting unit that transmits the answer signals, and a mobile-device control unit that detects individual signal strengths of signals which are transmitted from the transmitting antennas of the vehicle-side device. When the signal strengths of the signals transmitted from the transmitting antennas are detected by the mobile-device control unit and the sum of distances calculated using two data items among data items indicating the signal strengths is smaller than a predetermined threshold, the vehicle-side control unit or the mobile-device control unit determines that the mobile device is positioned inside the vehicle.

However, regarding the keyless entry apparatus described in Japanese Unexamined Patent Application Publication No. 2008-266955, in a case in which the mobile device is positioned in the vicinity of a signal line that is disposed in the vehicle, and in which a signal emitted from the signal line is received as noise by the mobile device, erroneous determination of whether the mobile device is positioned inside or outside the vehicle can be prevented. However, there is a problem that the erroneous determination caused by noise cannot be prevented in a case in which the mobile device exists outside the vehicle.

SUMMARY

A mobile device for a vehicle according to an aspect of the present disclosure includes: a receiving unit configured to receive transmission signals, each of the transmission signals being transmitted from a corresponding one of a plurality of transmitting antennas of a vehicle-side device; a control unit configured to determine a distance to each of the plurality of transmitting antennas using a signal strength of a corresponding one of the transmission signals received by the receiving unit; and a transmitting unit configured to transmit, to the vehicle-side device, data items indicating the distances to the plurality of transmitting antennas determined by the control unit. In a time period in which communication is not performed between the mobile device and the vehicle-side device, the control unit measures a signal strength of a signal received by the receiving unit to obtain a measurement value, and stores the measurement value as a noise element. When communication is performed between the mobile device and the vehicle-side device, the control unit performs correction for noise on the signal strengths of the transmission signals, each of the transmission signals being transmitted from a corresponding one of the plurality of transmitting antennas, and determines the distances to the plurality of transmitting antennas.

With this configuration, only the noise element in the environment in which the mobile device for the vehicle is placed is measured. After that, the signal strengths of the transmission signals transmitted from the individual transmitting antennas of the vehicle-side device are measured. Correction for noise is performed on the measured signal strengths, and the distances to the individual transmitting antennas are determined. The influence of the noise element can be removed in calculation of the distances to the transmitting antennas of the vehicle-side device. High-reliable data items indicating the distances can be obtained. Erroneous determination, which is performed by the vehicle-side device, of whether the mobile device is positioned inside or outside the vehicle can be prevented.

DESCRIPTION OF THE EXEMPLARY EMBODIMENTS

Hereinafter, an embodiment of the present invention will be described in detail with reference to the accompanying drawings.

Figure 1:
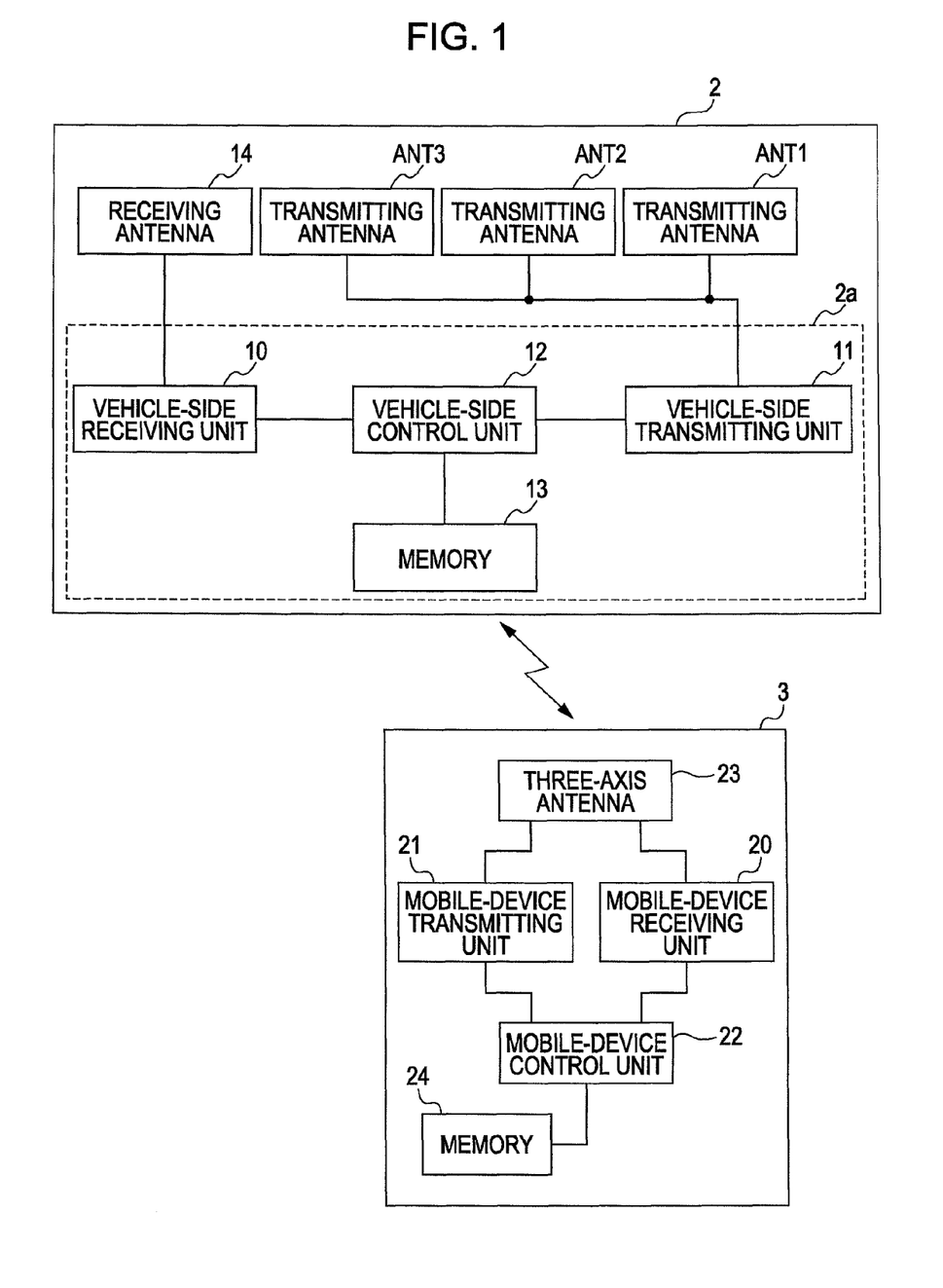
FIG. 1 is a functional block diagram of a keyless entry apparatus in an embodiment of the present invention.
Figure 2:
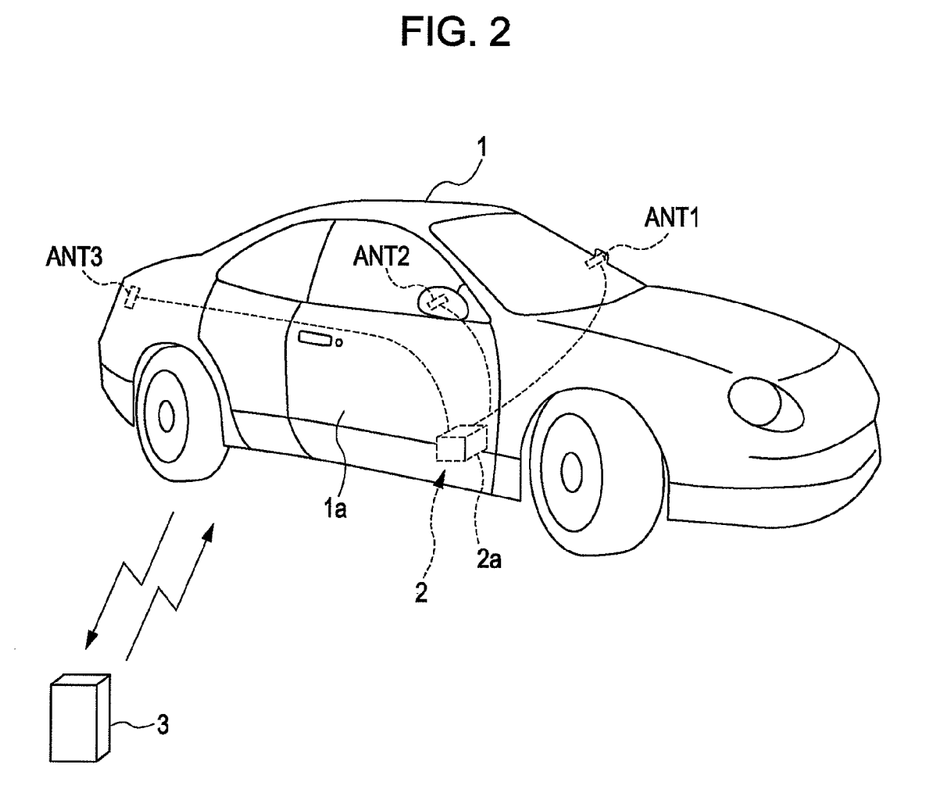
FIG. 2 is a diagram illustrating an overview of the keyless entry apparatus in the embodiment.

FIG. 1 is a functional block diagram of a keyless entry apparatus in the present embodiment. FIG. 2 is a diagram illustrating an overview of the keyless entry apparatus in the present embodiment. Regarding the keyless entry apparatus in the present embodiment, a vehicle 1 is provided with a vehicle-side device 2, a user carries a mobile device 3, and wireless communication is performed between the vehicle-side device 2 and the mobile device 3, thereby performing authentication, locking/unlocking, provision of other instructions, and so forth. Regarding the vehicle-side device 2, an electronic control section 2a is mounted in the vehicle 1, and concentrates on performing processes including entering processes using various types of switches, a communication process using a local area network (LAN), a process of authenticating the mobile device 3, and so forth. Furthermore, the vehicle-side device 2 has a plurality of transmitting antennas ANT1 to ANT3 that are provided on portions of the vehicle 1. A transmission signal having a first frequency (a low frequency) is transmitted from each of the transmitting antennas ANT1 to ANT3 to the mobile device 3.

In the present embodiment, in a case in which communication for authentication or the like is performed between the vehicle-side device 2 and the mobile device 3, in which authentication is successful, and in which it is determined that the mobile device 3 exists outside the vehicle 1, a vehicle-side control unit 12 performs control of unlocking a door 1a.

Next, a configuration of the vehicle-side device 2 and a configuration of the mobile device 3 will be described.

The vehicle-side device 2 includes a vehicle-side receiving unit 10, a vehicle-side transmitting unit 11, and a vehicle-side control unit 12. The vehicle-side receiving unit 10 receives a response signal that is transmitted from the mobile device 3. The vehicle-side transmitting unit 11 transmits transmission signals (including an activation signal, various types of commands, IDs, and so forth) to the mobile device 3. The vehicle-side control unit 12 analyzes the response signal, and performs various types of control. Furthermore, the vehicle-side control unit 12 is provided with a memory 13 that stores information items necessary for control, such as a vehicle-specific ID and IDs of a plurality of mobile devices capable of operating one vehicle. Additionally, a receiving antenna 14 for receiving the response signal is connected to the vehicle-side receiving unit 10. The transmitting antennas ANT1 to ANT3 for transmitting the transmission signals are connected to the vehicle-side transmitting unit 11.

The mobile device 3 includes a mobile-device receiving unit 20, a mobile-device transmitting unit 21, a mobile-device control unit 22, and a memory 24. The mobile-device receiving unit 20 receives the transmission signals that are transmitted from the vehicle-side device 2. The mobile-device transmitting unit 21 transmits, to the vehicle-side device 2, the response signal including an information item concerning distances. The mobile-device control unit 22 has a function of calculating a distance, which is described below, and performs various types of control when the transmission signals are received. The memory 24 stores an ID that is set in the mobile device 3, and an ID of a vehicle, and so forth, and further stores a measured noise data item, which is described below. Furthermore, a three-axis antenna 23 is connected to the mobile-device receiving unit 20 and the mobile-device transmitting unit 21. The three-axis antenna 23 is used to transmit/receive the transmission signals and the response signal, and has directional characteristics in directions orthogonal to each other.

The mobile-device control unit 22 is periodically activated. The mobile-device control unit 22 measures the signal strength of a signal that is received in a state in which the transmitting antennas ANT1 to ANT3 of the vehicle 1 do not output transmission signals, and acquires received signal strength indictor (RSSI) values corresponding to only a noise element. Furthermore, the mobile-device control unit 22 changes the state of the mobile device 3 from a sleep state that is a state in which power consumption is approximately zero to a normal state in accordance with the activation signal included in a transmission signal that is received from the vehicle-side device 2 by the mobile-device receiving unit 20. The mobile-device control unit 22 sequentially receives transmission signals that are transmitted from the individual transmitting antennas ANT1 to ANT3, and measures RSSI values for the transmission signals. The mobile-device control unit 22 calculates distances to the individual transmitting antennas ANT1 to ANT3. In this case, as described below, a process of removing the noise element from the RSSI values that are measured for the individual transmission signals is added. The information item concerning the distances that are calculated using correction for noise is transmitted as the response signal. Note that, in the present embodiment, the signal strength of a received signal can be detected by the three-axis antenna 23.

Next, an operation for calculation of the distances to the individual transmitting antennas ANT1 to ANT3 in the keyless entry apparatus in the present embodiment will be described.

Figure 3:
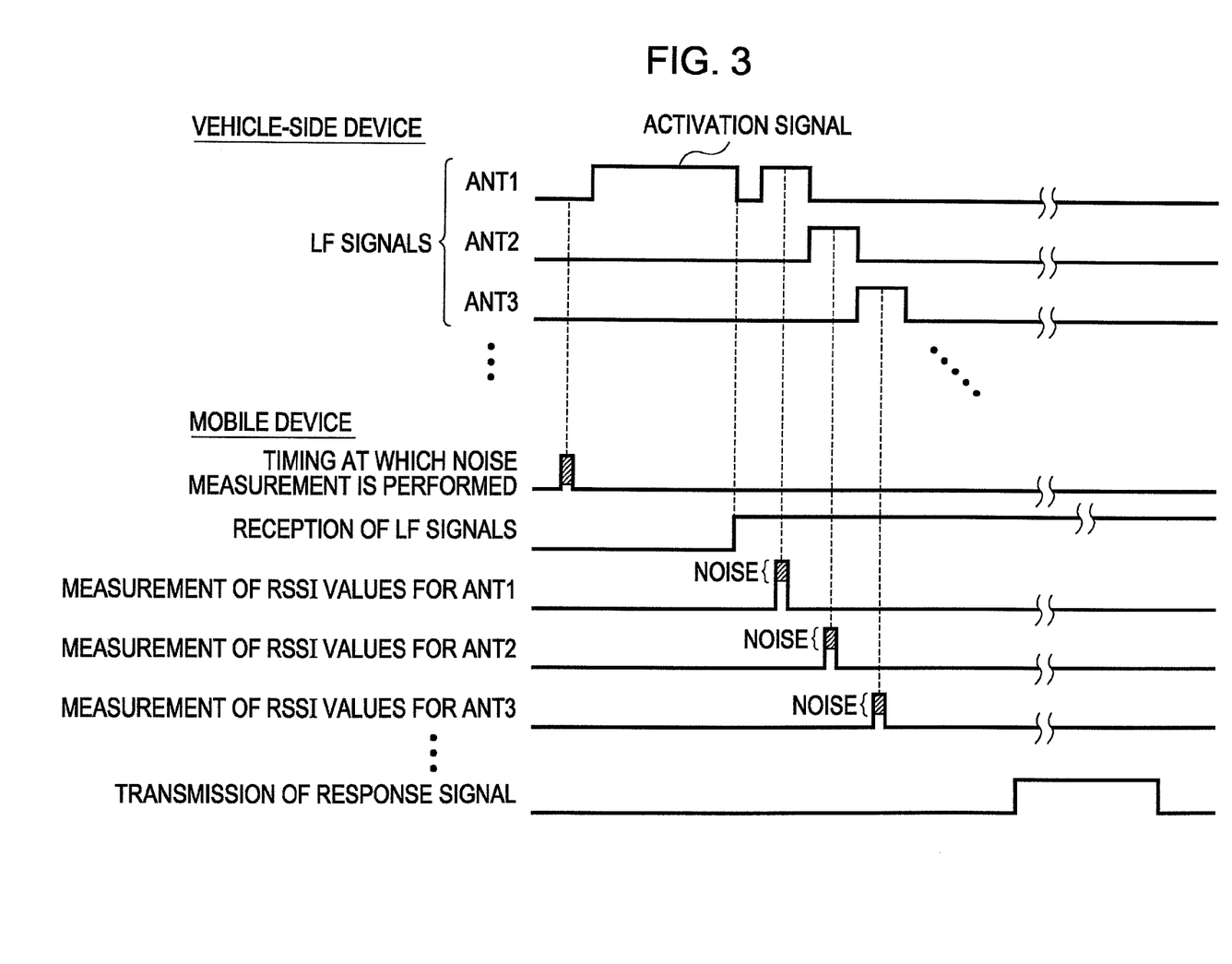
FIG. 3 is a timing diagram illustrating a timing at which noise measurement is performed and a timing at which measurement of received signal strength indictor values is performed.

FIG. 3 is a timing diagram illustrating a timing at which noise measurement is performed and a timing at which measurement of the RSSI values for the transmission signals is performed. The vehicle-side device 2 transmits the activation signal from one of the transmitting antennas ANT1 to ANT3 (the transmitting antenna ANT1 in this example) in a predetermined period, thereby activating the mobile device 3. After the vehicle-side device 2 transmits the activation signal, the vehicle-side device 2 transmits the transmission signals for measuring RSSI values from the transmitting antennas ANT1 to ANT3 at different times.

Here, each of the transmission signals for measuring RSSI values that are transmitted from the individual transmitting antennas ANT1 to ANT3 is a pulse signal that has a predetermined strength and that continues over a predetermined period, and is used to measure the signal strength of the transmission signal received by the mobile device 3. An RF signal that is an answer signal having a second frequency (a high frequency) is received from the mobile device 3. Then, after a predetermined time elapses, the transmission signals for measuring RSSI values are transmitted from the individual transmitting antennas ANT1 to ANT3 by the vehicle-side transmitting unit 11 at predetermined intervals in a predetermined order.

The mobile device 3 detects the signal strength of a received signal with the three-axis antenna 23 in a time period in which communication is not performed between the mobile device 3 and the vehicle-side device 2. It can also be said that the time period in which communication is not performed between the mobile device 3 and the vehicle-side device 2 is a time period in which the mobile device 3 does not receive transmission signals (the activation signal and other transmission signals) from the vehicle-side device 2. The RSSI values that are calculated using the signal strength of a received signal in the time period in which the mobile device 3 does not receive transmission signals (the activation signal and other transmission signals) can be recognized as a noise element for the transmission signals for measuring RSSI values. The mobile device 3 detects only the noise element, and stores the detected noise element as a noise data item in the memory 24. After the mobile device 3 stores the noise data item in the memory 24, the mobile device 3 changes to being in the sleep state.

As described above, the mobile device 3 is activated by receiving the activation signal from the vehicle-side device 2. However, the mobile device 3 must calculate the distances using the RSSI values for the transmission signals that are received after that, and promptly transmit the response signal (the information item concerning the distances) back to the vehicle-side device 2. For this reason, the mobile device 3 completes the noise measurement in advance.

In contrast, when the mobile device 3 receives the activation signal from the vehicle-side device 2, the mobile device 3 changes from being in the sleep state to being in the normal state. The mobile device 3 sequentially receives the transmission signals for measuring RSSI values that are transmitted from the individual transmitting antennas ANT1 to ANT3, and measures the RSSI values.

Identification of the transmission signals for measuring RSSI values that are transmitted from the individual transmitting antennas ANT1 to ANT3 can be performed in the following procedure. In the mobile device 3, it is determined whether or not an ID included in the activation signal coincides with the ID that the mobile device 3 holds. When the ID included in the activation signal coincides with the ID that the mobile device 3 holds, the mobile-device control unit 22 causes the mobile-device transmitting unit 21 to transmit an answer signal RF1. Reception of the answer signal RF1 with the vehicle 1 indicates that the mobile device 3 stores an information item concerning when and from which transmitting antenna a signal will be transmitted. Furthermore, the mobile device 3 activates a timer at a time at which the mobile device 3 receives the answer signal RF1, and measures a reception time. Then, the mobile device 3 compares the information item and the reception time, whereby the mobile device 3 can recognize from which transmitting antenna among the transmitting antennas ANT1 to ANT3 a transmission signal for measuring RSSI values has been transmitted. Note that a method for measuring the signal strength of a signal is not limited to a method in which a transmission signal for measuring RSSI values is transmitted by the vehicle 1, and in which the signal strength of the transmission signal is measured by the mobile device 3. Any method in which the signal strength of a signal other than the transmission signal that is transmitted from the vehicle 1 is measured may be used.

As illustrated in FIG. 3, each of the RSSI values that are calculated using the signal strengths of the received transmission signals for measuring RSSI values includes the noise element, and the amount of noise in the noise element depends on the surrounding environment. In the present embodiment, the noise element measured in advance is read from the memory 24, correction in which the noise element is removed from the individual RSSI values is added, and the distances to the individual transmitting antennas ANT1 to ANT3 are calculated. The response signal including data items indicating the calculated distances is transmitted.

Figure 4:
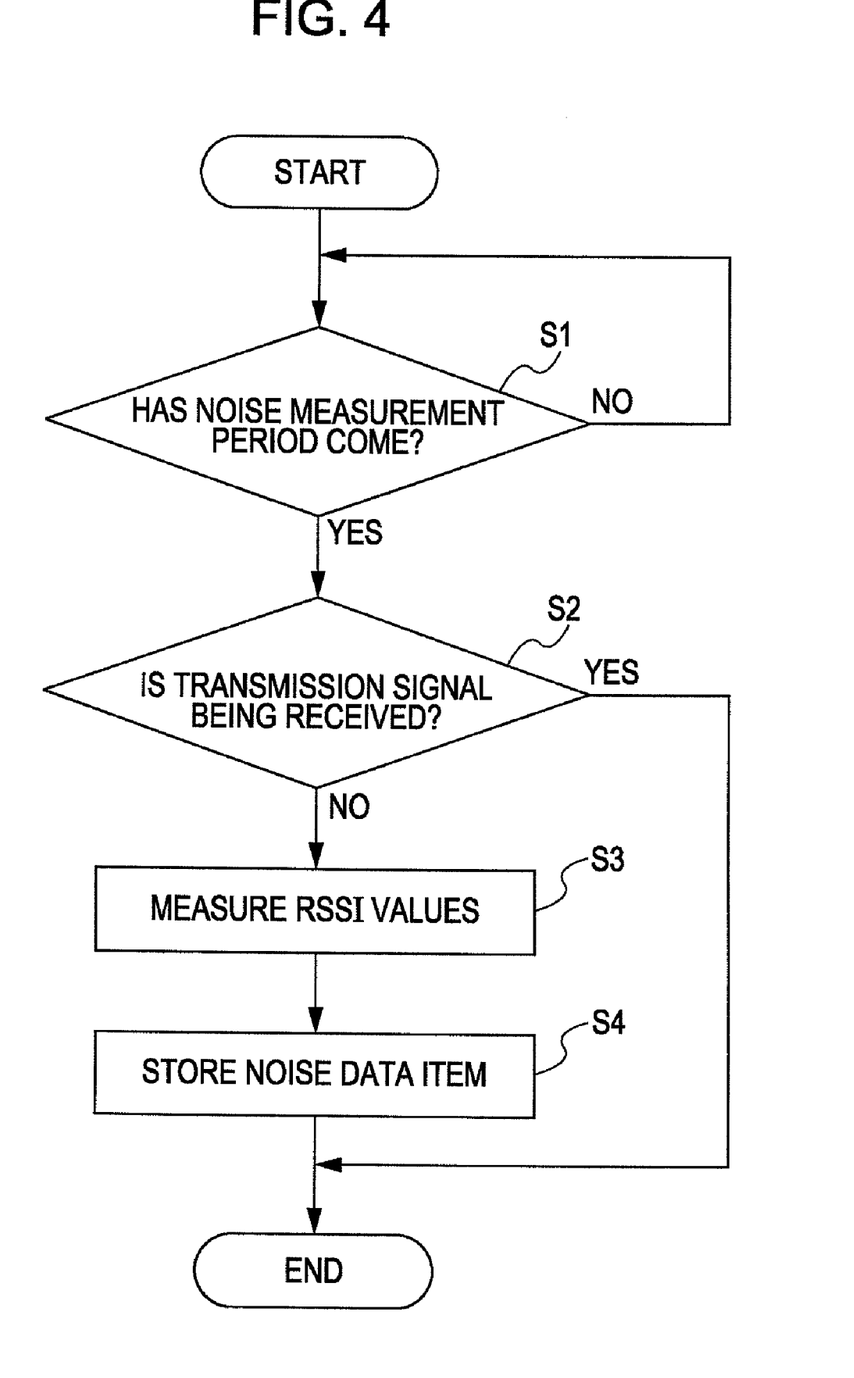
FIG. 4 is a flowchart for noise measurement in a mobile device.

FIG. 4 is a flowchart for noise measurement in the mobile device 3. A noise measurement period is set in advance in the mobile device 3. In a case in which the mobile device 3 is in the sleep state when the noise measurement period comes, the mobile device 3 changes to being in the normal state (step S1). In this case, when the mobile device 3 is receiving a transmission signal (the activation signal or one of the transmission signals for measuring RSSI values) from the vehicle-side device 2 (step S2), the process is terminated because the noise element cannot be accurately measured. In contrast, when it is determined that the vehicle-side device 2 is not receiving a transmission signal (step S2), the mobile device 3 measures RSSI values using the signal strength of a signal that is transmitted from the fixed transmitting antenna ANT1 (step S3). The RSSI values that are measured in this case do not include signal elements that are transmitted from the vehicle. Accordingly, the mobile device 3 considers the RSSI values as RSSI values that are calculated using only the noise element, and stores the RSSI values as the nose element in the memory 24 (step S4). In this manner, the noise data item measured in the current radio environment is stored in the memory 24 of the mobile device 3 in advance.

Figure 5:
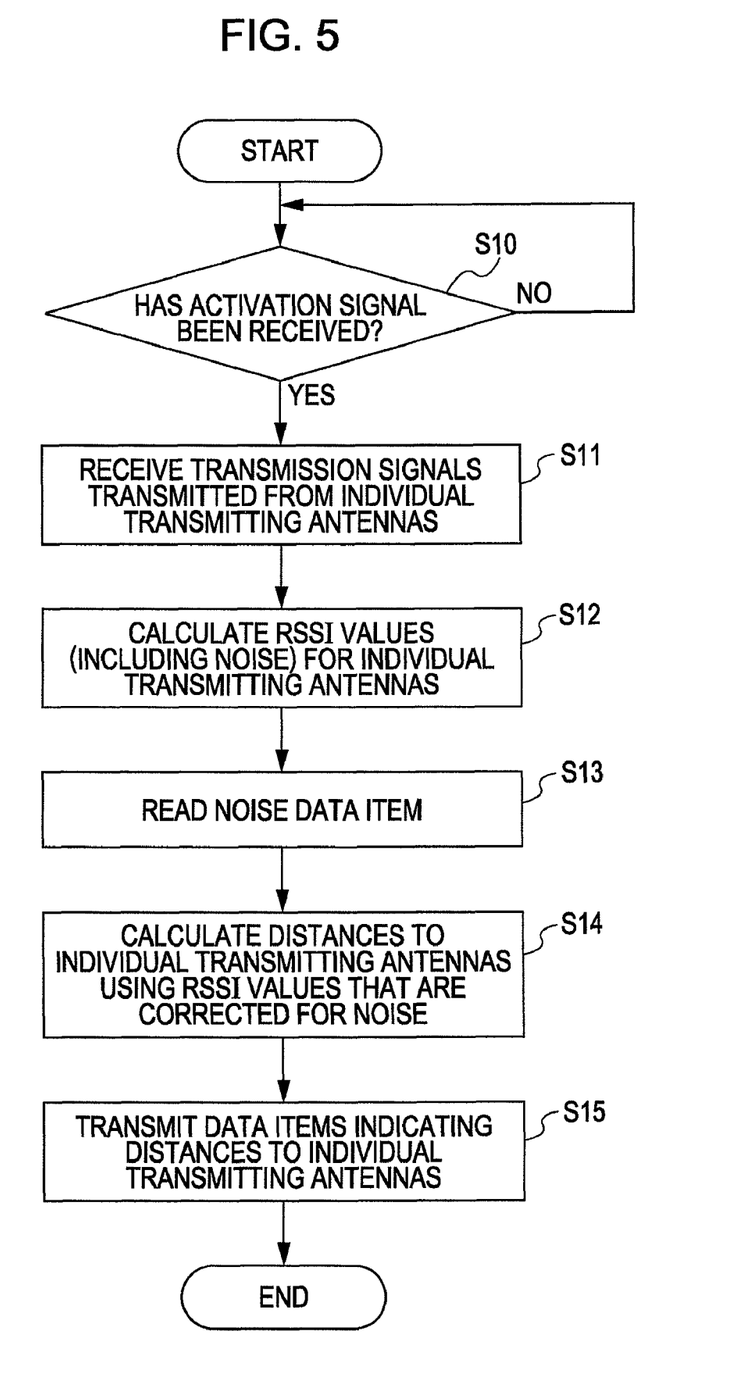
FIG. 5 is a flowchart for calculating distances to individual transmission antennas.

FIG. 5 is a flowchart for calculating the distances to the individual transmitting antennas ANT1 to ANT3 using the RSSI values that are measured using the transmission signals for measuring RSSI values in the mobile device 3.

When the mobile device 3 receives the activation signal, the mobile device 3 changes from being in the sleep state to being in the normal state (step S10). When the mobile device 3 changes to being in the normal state, the mobile device 3 receives, with the mobile-device receiving unit 20, the transmission signals for measuring RSSI values that are transmitted from the individual transmitting antennas ANT1 to ANT3 (step S11). As described above, the mobile-device control unit 22 measures, with the three-axis antenna 23, the signal strengths of the transmission signals for measuring RSSI values, and calculates the RSSI values that are data items indicating the signal strengths for the individual transmitting antennas which are measured by the three-axis antenna 23 (step S12).

After the mobile-device control unit 22 measures the RSSI values using the transmission signals for measuring RSSI values, the mobile-device control unit 22 reads the noise data item that is stored in the memory 24 in step S4 (step S13). The mobile-device control unit 22 calculates, using the RSSI values from which the noise element is removed, the distances between the mobile device 3 and the individual transmitting antennas ANT1 to ANT3 (step S14). The mobile-device control unit 22 calculates a distance Ls to each of the transmitting antennas in accordance with Equation (1) given below.

$$Ls = K / [(kx \cdot Xsn^2 + ky \cdot Ysn^2 + kz \cdot Zsn^2) - (kx \cdot Xn^2 + ky \cdot Yn^2 + kz \cdot Zn^2)]^{1/6} \quad (1)$$

Here, Ls is a calculated value of a distance which is corrected for noise. K, kx, ky, and kz are correction values for the mobile device. Xsn, Ysn, and Zsn are RSSI values in the respective X axis direction, Y axis direction, and Z axis direction that are calculated using the signal strength of the received signal including the noise element. Xn, Yn, and Zn are RSSI values in the respective X axis direction, Y axis direction, and Z axis direction that are calculated using only the noise element.

As calculated in accordance with Equation (1) given above, by subtracting the RSSI values (Xsn, Ysn, and Zsn), which correspond to only the noise element, from the RSSI values (Xn, Yn, and Zn), which correspond to the received signal including the noise element, an accurate distance that is corrected for noise can be calculated.

Note that, in the present invention, an equation for calculating the distance to each of the transmitting antennas is not limited to Equation (1) given above. Any equation including a term corresponding to a process of performing correction for noise using the RSSI values (Xn, Yn, and Zn), which correspond to only the noise element, can be used.

For example, the distance Ls to each of the transmitting antennas can be calculated in accordance with Equation (2) given below.

$$Ls = K/[(kx(Xsn-Xn)^2 + (ky(Ysn-Yn)^2 + (kz(Zsn-Zn)^2]^{1/6} \quad (2)$$

The distances Ls are calculated for all of the transmitting antennas ANT1 to ANT3 in accordance with Equation (1) or (2), which are given above, (step S14). Then, the mobile device 3 transmits the response signal including the distances Ls to the vehicle-side device 2 (step S15). In this case, the response signal including the ID that is set in the individual mobile device 3 is transmitted.

The vehicle-side transmitting unit 11 of the vehicle-side device 2 receives the response signal that is transmitted from the mobile device 3. The vehicle-side control unit 12 determines whether or not the ID included in the response signal coincides with one of the IDs that are registered in the vehicle. When the ID included in the response signal coincides with one of the IDs that are registered in the vehicle, the vehicle-side control unit 12 analyzes the distances Ls from the individual transmitting antennas ANT1 to ANT3 that are included in the response signal, and determines the position of the mobile device 3.

Furthermore, considering a case in which high-reliable data items indicating the distances cannot be calculated even when correction is performed because noise that is input to the mobile device 3 is large, the mobile device 3 may be configured to transmit, in the above-mentioned case, an alternative data item, with which malfunction in the vehicle-side device 2 can be prevented, without transmitting the data items indicating the distances Ls that are calculated in accordance with Equation (1) or (2) given above.

A combination of calculation of each of the distances Ls to a corresponding one of the transmitting antennas in accordance with Equation (1) or (2) given above and a determination process given below is performed, thereby determining a data item indicating the distance that is to be finally transmitted back to the vehicle-side device 2.

In other words, a distance Lsn is calculated using the RSSI values corresponding to the received signal including the noise element, and a distance Ln is calculated using only the noise element. The distances Lsn and Ln are separately determined, for example, in accordance with Equations (3) and (4), respectively.

$$Lsn = K/[(kx \cdot Xsn^2 + ky \cdot Ysn^2 + kz \cdot Zsn^2) - kn]^{1/6} \quad (3)$$

$$Ln = K/[(kx \cdot Xn^2 + ky \cdot Yn^2 + kz \cdot Zn^2 - kn)]^{1/6} \quad (4)$$

Here, kn is an arbitral correction term.

Ln/Lsn is determined using the distances Lsn and Ln that are calculated in accordance with Equations (3) and (4) given above, respectively, and the degree of the influence of noise to an essential signal element is evaluated. For example, whether or not a relationship Ln/Lsn>Q that is a predetermined value is true is determined. Supposing that the predetermined value Q is set to be 0.5, whether or not the noise element included in the transmission signal for measuring RSSI values is larger than the essential signal element can be evaluated. When the relationship Ln/Lsn>Q is true, the distance to the transmitting antenna is replaced with a maximum distance Lmax instead of the value that is calculated in accordance with Equation (1) or (2) given above. In other words, the data item indicating the distance to the transmitting antenna is replaced with the alternative data item that is a data item indicating the maximum distance which can be notified from the mobile device 3 of the vehicle-side device 2 (for example, Ls=255).

In a case in which a desired accuracy cannot be achieved even when the noise element is removed because the noise element included in the transmission signal for measuring RSSI values is larger than the essential signal element (in a case in which the relationship Ln/Lsn>Q is true), the mobile-device control unit 22 transmits the alternative data item, which is a data item indicating that the distance to the transmitting antenna is the maximum distance Lmax, back to the vehicle-side device 2, instead of the data item indicating the distance that is determined in accordance with Equation (1) or (2) given above.

When the vehicle-side device 2 receives the alternative data item indicating the maximum distance Lmax as a data item indicating the distance that is included in the response signal which is transmitted from the mobile device 3, the vehicle-side device 2 determines that the mobile device 3 exists outside the vehicle 1.

As described above, in a case in which the reliability of determination of the position of the mobile device 3 is low because noise is large, the vehicle-side device 2 is actively controlled to determine that the mobile device 3 exists outside the vehicle 1. With this control, the vehicle-side device 2 can realize a more stable operation, compared with a case in which the vehicle-side device 2 erroneously determines that the mobile device 3 exists inside the vehicle 1 and performs the subsequent process.

As described above, with the mobile device 3 according to the present embodiment, the signal strength of a received signal is measured in a state in which the transmitting antennas ANT1 to ANT3 of the vehicle 1 do not output transmission signals, and the RSSI values corresponding to only the noise element are acquired. The transmission signals that are transmitted from the individual transmitting antennas ANT1 to ANT3 are received in a state in which the transmission signals include the noise element, and the RSSI values corresponding to the received transmission signals including the noise element are calculated. The RSSI values corresponding to the received transmission signals including the noise element are corrected using the RSSI values corresponding to only the noise element. Accordingly, high-reliable data items indicating the distances from which the noise element is removed can be calculated, and an accuracy of determination, which is performed by the vehicle-side device 2, of whether the mobile device 3 exists inside or outside the vehicle 1 can be improved.

Furthermore, with the mobile device 3 according to the present embodiment, in a case in which a high-reliable data item indicating each of the distances cannot be calculated because noise that is input to the mobile device 3 is large, the alternative data item indicating that the distance to the transmitting antenna is the maximum distance Lmax is transmitted back to the vehicle-side device 2 without transmitting the data item indicating the distance Ls that is calculated in accordance with Equation (1) or (2) given above. Thus, the vehicle-side device 2 can be controlled so that the vehicle-side device 2 will perform a more stable operation.

Note that the present invention is not limited to the above-described embodiment, and various modifications may be made without departing from the gist of the present invention.

What is claimed is:

1. A mobile device for a vehicle, the mobile device comprising:
   a receiving unit configured to receive transmission signals, each of the transmission signals being transmitted from a corresponding one of a plurality of transmitting antennas of a vehicle-side device;
   a control unit configured to determine a distance to each of the plurality of transmitting antennas using a signal strength of a corresponding one of the transmission signals received by the receiving unit; and a transmitting unit configured to transmit, to the vehicle-side device, data items indicating the distances to the plurality of transmitting antennas determined by the control unit, wherein, in a time period in which communication is not performed between the mobile device and the vehicle-side device, the control unit measures a signal strength of a signal received by the receiving unit to obtain a measurement value and stores the measurement value as a noise element, and, when communication is performed between the mobile device and the vehicle-side device, the control unit performs correction for noise on the signal strengths of the transmission signals, each of the transmission signals being transmitted from a corresponding one of the plurality of transmitting antennas, and determines the distances to the plurality of transmitting antennas, wherein the control unit compares a distance $L_{sn}$ calculated using the signal strength of each of the transmission signals including the noise element with a distance $L_n$ calculated using only the noise element, and, when a ratio of the distance $L_n$ to the distance $L_{sn}$ is larger than a predetermined value, the control unit transmits, as the distance to a corresponding one of the plurality of transmitting antennas, an alternative data item with which malfunction in the vehicle-side device is prevented.

2. The mobile device for a vehicle according to claim 1, wherein the control unit transmits a data item indicating a maximum distance as the alternative data item with which malfunction in the vehicle-side device is prevented.

* * * * *